United States Patent
Fujimaki et al.

(10) Patent No.: US 11,243,221 B2
(45) Date of Patent: Feb. 8, 2022

(54) MONITORING DEVICE AND MONITORING METHOD OF MAIN SPINDLE ROTATING SPEED IN MACHINE TOOL, AND MACHINE TOOL

(71) Applicant: OKUMA CORPORATION, Niwa-Gun (JP)

(72) Inventors: Shunsuke Fujimaki, Niwa-Gun (JP); Akihide Hamaguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/061,693

(22) Filed: Oct. 2, 2020

(65) Prior Publication Data

US 2021/0132101 A1  May 6, 2021

(30) Foreign Application Priority Data

Oct. 30, 2019 (JP) .............................. JP2019-197710

(51) Int. Cl.
    *G01P 3/02* (2006.01)
    *G01P 1/07* (2006.01)

(52) U.S. Cl.
    CPC . *G01P 3/02* (2013.01); *G01P 1/07* (2013.01)

(58) Field of Classification Search
    CPC ......... G01P 3/02; G01P 1/07; B23Q 17/0976; G05B 19/00
    See application file for complete search history.

(56) References Cited

U.S. PATENT DOCUMENTS

| 4,484,295 A | * | 11/1984 | Bedard | H05B 47/155 |
| | | | | 708/8 |
| 2006/0047357 A1 | * | 3/2006 | Tanaka | G05B 19/186 |
| | | | | 700/160 |
| 2012/0093598 A1 | * | 4/2012 | Ando | B23Q 17/007 |
| | | | | 408/16 |
| 2012/0097411 A1 | * | 4/2012 | Yoshino | B23Q 17/12 |
| | | | | 173/176 |
| 2013/0226355 A1 | * | 8/2013 | Ueno | G05B 19/4166 |
| | | | | 700/280 |

FOREIGN PATENT DOCUMENTS

| CN | 105911434 B | * | 10/2018 | ........... G01R 31/086 |
| JP | S49-105277 A1 | | 10/1974 | |
| JP | 2013-63497 A | * | 4/2013 | ......... G05B 19/4062 |
| JP | 5507410 B2 | | 5/2014 | |

\* cited by examiner

*Primary Examiner* — Tung S Lau
(74) *Attorney, Agent, or Firm* — Burr & Brown, PLLC (57) ABSTRACT

A monitoring device of a main spindle rotation speed in a machine tool displays a variation state of the rotation speed by a rotation speed variation unit using a display unit in the machine tool. The monitoring device includes a variation value setting unit, a drawing unit, a first display unit, and a settable range calculating unit. The settable range calculating unit is configured to calculate a settable range of a variation amplitude and a variation cycle based on a calculation formula. The calculation formula includes the variation cycle, a difference between a first rotation speed and a second rotation speed at mutually different timings among the rotation speeds varied relative to a reference rotation speed, an inertia of a rotating body, a rated output of a motor that drives a main spindle, and a usage proportion to the rated output of the motor.

19 Claims, 6 Drawing Sheets

MONITORING DEVICE AND MONITORING METHOD OF MAIN SPINDLE ROTATING SPEED IN MACHINE TOOL, AND MACHINE TOOL

BACKGROUND OF THE INVENTION

This application claims the benefit of Japanese Patent Application Number 2019-197710 filed on Oct. 30, 2019, the entirety of which is incorporated by reference.

TECHNICAL FIELD OF THE INVENTION

The disclosure relates to a monitoring method and a monitoring device that display a variation state of a rotation speed, which is varied by a rotation speed variation unit, by using a display unit in a machine tool, and the machine tool with the monitoring device. The machine tool includes a main spindle and the rotation speed variation unit. A tool or a workpiece is mounted to the main spindle which is motor-driven. The rotation speed variation unit continuously varies the rotation speed of the main spindle in any given pattern.

DESCRIPTION OF RELATED ART

When a machine tool that includes a main spindle to which a tool or a workpiece is mounted to be motor-driven performs a cutting work, so-called "chatter vibration" occurs in some cases due to low rigidity of the tool or the workpiece. The chatter vibration causes problems, such as a partial loss of the tool and deterioration of surface accuracy of the workpiece. The chatter vibration is a vibration that increases due to variation of cutting thickness of the workpiece caused by a phase lag between an undulation occurred in a machined surface one rotation before and a vibration caused by the current cutting.

As a technique to reduce the chatter vibration, Japanese Patent Application Publication No. S49-105277 has proposed countermeasures that varies a rotation speed of a main spindle by predetermined variation amplitude and variation cycle to make an input of power irregular by variation of a cutting thickness.

However, since the method described in Japanese Patent Application Publication No. S49-105277 needs to set the two values, the variation amplitude and the variation cycle, it is difficult for an operator to determine that which value is to be changed. Accordingly, the applicant has proposed a method that displays, for example, an output limit line of a motor that drives a main spindle in a monitoring device to facilitate settings of a variation amplitude and a variation cycle in Japanese Patent No. 5507410.

However, in Japanese Patent No. 5507410, a formula for computation of the motor output limit line is constituted by a square of a rotation speed at any given timing, thereby having an issue in estimation accuracy. For example, when a variation condition is set in accordance with the output limit line displayed using a median of the rotation speed, there may be a case where the variation condition actually exceeds a motor output limit. That is, the varication cannot be performed with the setting value. Additionally, when the output limit line is displayed using the maximum value of the rotation speed, the motor output is restricted more than necessary, possibly losing an opportunity for improvement in reduction effect of chatter vibration.

Therefore, an object of the disclosure is to provide a monitoring method and a monitoring device of a main spindle rotation speed in a machine tool that includes a rotation speed variation unit that continuously varies the main spindle rotation speed in any given pattern and the machine tool. The monitoring method and the monitoring device allow easily selecting a setting value to vary the rotation speed based on a motor output limit inferred with further high accuracy and allow finding a machining condition optimal to reduce a chatter vibration.

SUMMARY OF THE INVENTION

In order to achieve the above-described object, a monitoring device of a main spindle rotation speed in a machine tool according to a first aspect of the disclosure is provided. The monitoring device displays a variation state of the rotation speed by a rotation speed variation unit using a display unit in the machine tool. The machine tool includes a main spindle and the rotation speed variation unit. The main spindle to which a tool or a workpiece is mounted is motor-driven. The rotation speed variation unit continuously varies the rotation speed of the main spindle in any given pattern. The monitoring device includes a variation value setting unit, a drawing unit, a first display unit, and a settable range calculating unit. The variation value setting unit is configured to set a variation amplitude and a variation cycle of the rotation speed. The drawing unit is configured to display a variation diagram in the display unit. The variation diagram illustrates a relationship between the variation amplitude and the variation cycle. The first display unit is configured to display a current variation position in the variation diagram. The settable range calculating unit is configured to calculate a settable range of the variation amplitude and the variation cycle based on a calculation formula. The calculation formula includes the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, a rated output of a motor that drives the main spindle, and a usage proportion to the rated output of the motor.

In the disclosure of a second aspect in the above-described configuration, the calculation formula is Math. 1 below.

$$R = \frac{2J}{eP - P_C}(S_1 - S_2)S_1 \qquad \text{[Math. 1]}$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion In the disclosure of a third aspect in the above-described configuration, the calculation formula includes a ratio of the first rotation speed to the second rotation speed.

In the disclosure of a fourth aspect in the above-described configuration, the calculation formula is Math. 2 below.

$$R = \frac{2J}{eP - P_C}(S_1 - S_2)S_1\frac{S_1}{S_2} \quad [\text{Math. 2}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion In the disclosure of a fifth aspect in the above-described configuration, any one of the first rotation speed and the second rotation speed is set as a maximum value of the rotation speed and another is set as a minimum value of the rotation speed.

The disclosure of a sixth aspect in the above-described configuration further includes an output limit line display unit configured to generate an output limit line of the motor based on the settable range calculated by the settable range calculating unit and display the output limit line on the variation diagram.

The disclosure of a seventh aspect in the above-described configuration further includes a variation position calculating unit and a second display unit. The variation position calculating unit is configured to calculate a new variation position. The new variation position would be a portion where the variation amplitude is larger than the variation amplitude of the current variation position and the variation cycle is shorter than the variation cycle of the current variation position in a range equal to or less than the output limit line, or a portion where the variation amplitude is larger than the variation amplitude of the current variation position or the variation cycle is shorter than the variation cycle of the current variation position in a range equal to or less than the output limit line. The second display unit is configured to display the new variation position in the variation diagram together with a guide display. The guide display guides a change from the current variation position.

In the disclosure of an eighth aspect in the above-described configuration, the new variation position is set to a position on the output limit line where the variation amplitude is same as the variation amplitude of the current variation position.

In the disclosure of a ninth aspect in the above-described configuration, the new variation position is set to a position where the variation amplitude becomes the maximum on the output limit line.

In the disclosure of a tenth aspect in the above-described configuration, the variation value setting unit is configured to simultaneously set the variation amplitude and the variation cycle based on the calculation formula.

In order to achieve the above-described object, a machine tool according to an eleventh aspect of the disclosure is provided. The machine tool includes a main spindle, a rotation speed variation unit, and the monitoring device of the main spindle rotation speed according to any one of the first aspect to the tenth aspect. The main spindle to which a tool or a workpiece is mounted is motor-driven. The rotation speed variation unit is configured to continuously vary the rotation speed of the main spindle in any given pattern.

In order to achieve the above-described object, a monitoring method of a main spindle rotation speed in a machine tool according to a twelfth aspect of the disclosure is provided. The monitoring method displays a variation state of the rotation speed by a rotation speed variation unit using a display unit in the machine tool. The machine tool includes a main spindle and the rotation speed variation unit. The main spindle to which a tool or a workpiece is mounted is motor-driven. The rotation speed variation unit continuously varies the rotation speed of the main spindle in any given pattern. The monitoring method includes a variation value setting step, a drawing step, a first display step, and a settable range calculating step. The variation value setting step is a step of setting a variation amplitude and a variation cycle of the rotation speed. The drawing step is a step of displaying a variation diagram in the display unit. The variation diagram illustrates a relationship between the variation amplitude and the variation cycle. The first display step is a step of displaying a current variation position in the variation diagram. The settable range calculating step is a step of calculating a settable range of the variation amplitude and the variation cycle based on a calculation formula. The calculation formula includes the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, a rated output of a motor that drives the main spindle, and a usage proportion to the rated output of the motor.

In the disclosure of a thirteenth aspect in the above-described configuration, the calculation formula is Math. 1 below.

$$R = \frac{2J}{eP - P_C}(S_1 - S_2)S_1 \quad [\text{Math. 1}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion In the disclosure of a fourteenth aspect in the above-described configuration, the calculation formula includes a ratio of the first rotation speed to the second rotation speed.

In the disclosure of a fifteenth aspect in the above-described configuration, the calculation formula is Math. 2 below.

$$R = \frac{2J}{eP - P_C}(S_1 - S_2)S_1\frac{S_1}{S_2} \quad [\text{Math. 2}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion In the disclosure of a sixteenth aspect in the above-described configuration, any one of the first rotation speed and the second rotation speed is set as a maximum value of the rotation speed and another is set as a minimum value of the rotation speed.

The disclosure of a seventeenth aspect in the above-described configuration further includes an output limit line displaying step of generating an output limit line of the motor based on the settable range calculated by the settable range calculating step and displaying the output limit line on the variation diagram.

The disclosure of an eighteenth aspect in the above-described configuration further includes a variation position calculating step and a second display step. The variation position calculating step is a step of calculating a new variation position. The new variation position would be a portion where the variation amplitude is larger than the variation amplitude of the current variation position and the variation cycle is shorter than the variation cycle of the current variation position in a range equal to or less than the output limit line, or a portion where the variation amplitude is larger than the variation amplitude of the current variation position or the variation cycle is shorter than the variation cycle of the current variation position in a range equal to or less than the output limit line. The second display step is a step of displaying the new variation position in the variation diagram together with a guide display. The guide display guides a change from the current variation position.

In the disclosure of a nineteenth aspect in the above-described configuration, the new variation position is set to a position on the output limit line where the variation amplitude is same as the variation amplitude of the current variation position.

In the disclosure of a twentieth aspect in the above-described configuration, the new variation position is set to a position where the variation amplitude becomes a maximum on the output limit line.

In the disclosure of a twenty-first aspect in the above-described configuration, the variation value setting step is capable of simultaneously setting the variation amplitude and the variation cycle based on the calculation formula.

According to the disclosure, since the settable range of the variation amplitude and the variation cycle is calculated based on the difference between the two rotation speeds at different timings and the usage proportion to the rated output of the motor, the output limit of the motor is not exceeded and the variation can be performed with the set values, and the output from the motor is not restricted more than necessary. Accordingly, even when the two setting values, the variation amplitude and the variation cycle, are present, the operator can easily select the setting value to vary the rotation speed based on the motor output limit inferred with further high accuracy, and therefore the operator can quickly and easily find the machining condition optimal to reduce the chatter vibration.

Especially, with the disclosure described in the sixth and seventeenth aspects, in addition to the above-described effects, the operator can easily select the setting value to vary the rotation speed of the main spindle based on the current variation position and the accurately inferred output limit line on the variation diagram.

With the disclosure described in the seventh and eighteenth aspects, in addition to the above-described effects, the operator can quickly and easily find the machining condition optimal to reduce the chatter vibration by the calculation of the new variation position and the guide display.

With the disclosure described in the eighth and nineteenth aspects, in addition to the above-described effects, since the variation cycle is short, the chattering reduction effect is large. Additionally, since the variation amplitude is the same, the difference between the maximum value and the minimum value of the cutting speed does not change, thereby ensuring minimizing the deterioration of surface accuracy generated by the difference in cutting speed.

With the disclosure described in the ninth and twentieth aspects, in addition to the above-described effects, the large reduction effect of chatter vibration can be expected.

With the disclosure described in the tenth and twenty-first aspects, in addition to the above-described effects, the two parameters of the variation amplitude and the variation cycle can be simultaneously set in the one-time operation with the output from the motor maintained constant. Accordingly, the operator can easily set the variation values to vary the rotation speed of the main spindle in the state where the change in the amount of thermal displacement in association with the change in the amount of heat generation of the motor is reduced.

DETAILED DESCRIPTION OF THE INVENTION

The following describes embodiments of the disclosure based on the drawings.

Figure 1:
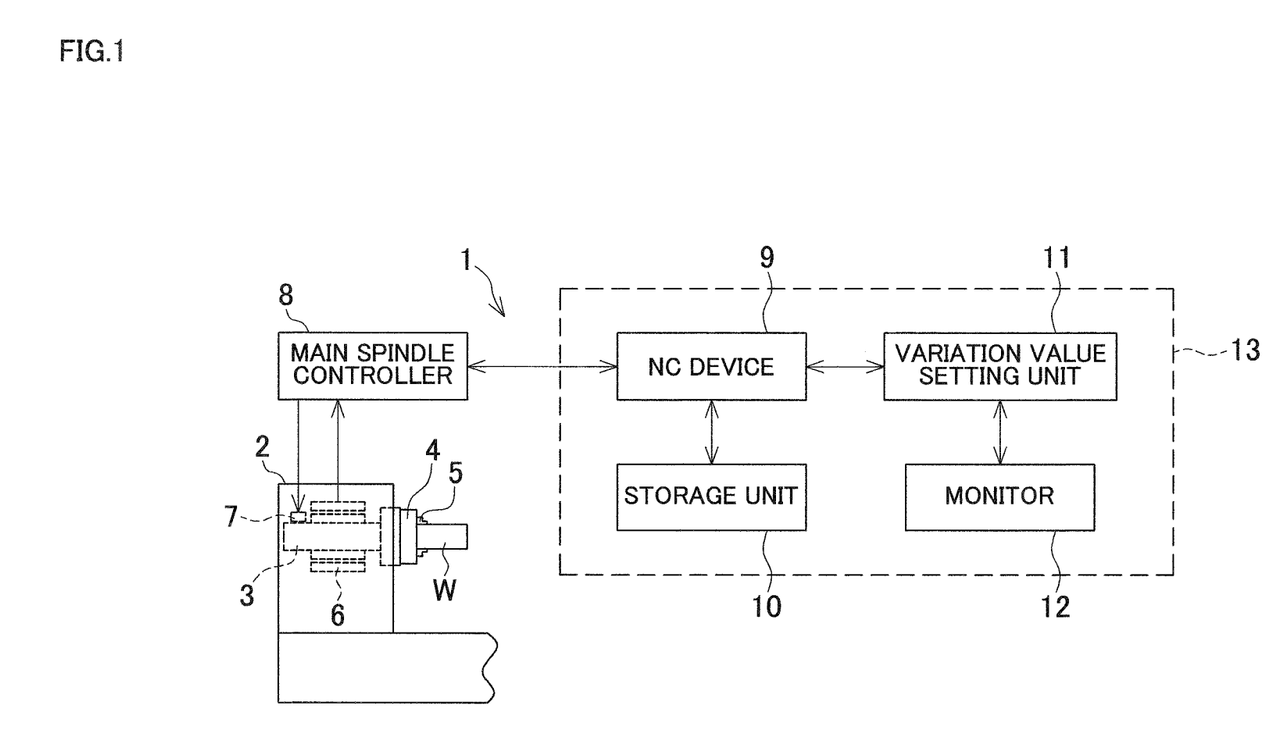
FIG. 1 is a schematic configuration diagram of an NC lathe.

FIG. 1 is a schematic configuration diagram of an NC lathe as one example of a machine tool. In the NC lathe 1, a main spindle 3 that grips a workpiece W via a chuck 4 and a claw 5 is rotatably journaled to a head stock 2. Inside of the head stock 2, a motor 6 that rotatably drives the main spindle 3 and an encoder 7 that is secured to the head stock 2 and detects a rotation speed of the main spindle 3 are built-in. A main spindle controller 8 is connected to the motor 6 and the encoder 7, and an NC device 9 commands the rotation speed to the main spindle controller 8. While the main spindle controller 8 always monitors the rotation speed of the main spindle 3 detected by the encoder 7, the main spindle controller 8 adjusts an input electric power supplied to the motor 6 such that the main spindle 3 is rotated at the rotation speed commanded by the NC device 9.

A storage unit 10 and a variation value setting unit 11 are connected to the NC device 9. The storage unit 10 stores a machining program and the like, and the variation value setting unit 11 includes a monitor 12 as a display unit. Following the machining program stored in the storage unit 10, while the NC device 9 rotates the main spindle 3, the NC device 9 feeds and moves a tool (not illustrated) in a rotation axis direction and a radial direction of the workpiece W for cutting work.

Figure 2:
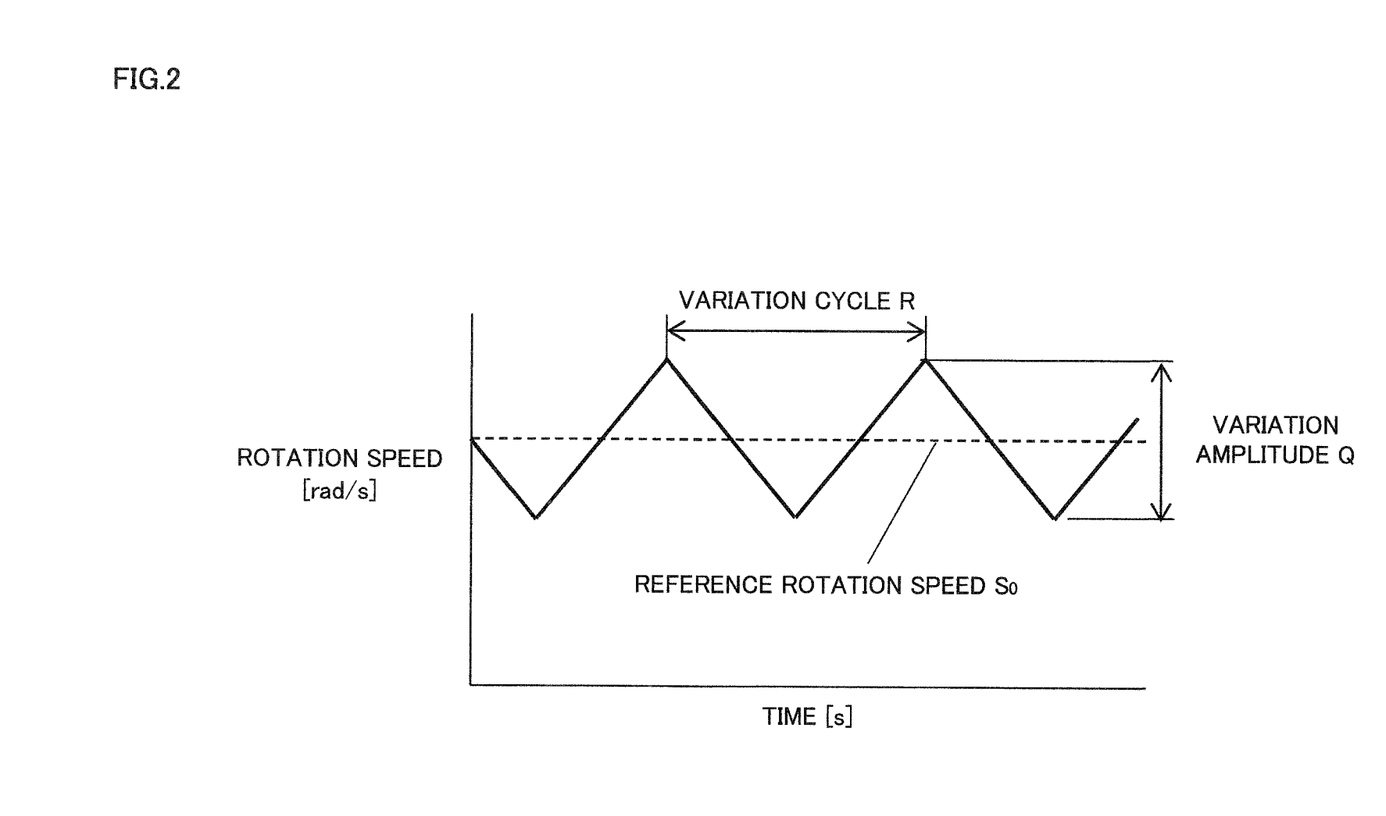
FIG. 2 is an explanatory view illustrating a variation example of a main spindle rotation speed.

Furthermore, the rotation speed of the main spindle 3 and its variation amplitude and variation cycle are input, from the monitor 12 that includes an input unit, to the variation value setting unit 11. Thus, as illustrated in FIG. 2, the rotation speed of the main spindle 3 can be varied with designated variation amplitude Q and variation cycle R via the NC device 9 and the main spindle controller 8. A monitoring device 13 includes the NC device 9, the storage unit 10, the variation value setting unit 11, and the monitor 12. The NC device 9 serves as a rotation speed variation unit and the variation value setting unit 11 serves as a variation value setting unit. The monitoring device 13 functions as a drawing unit, first and second display units, a settable range calculating unit, an output limit line display unit, and a variation position calculating unit of the disclosure.

Figure 3:
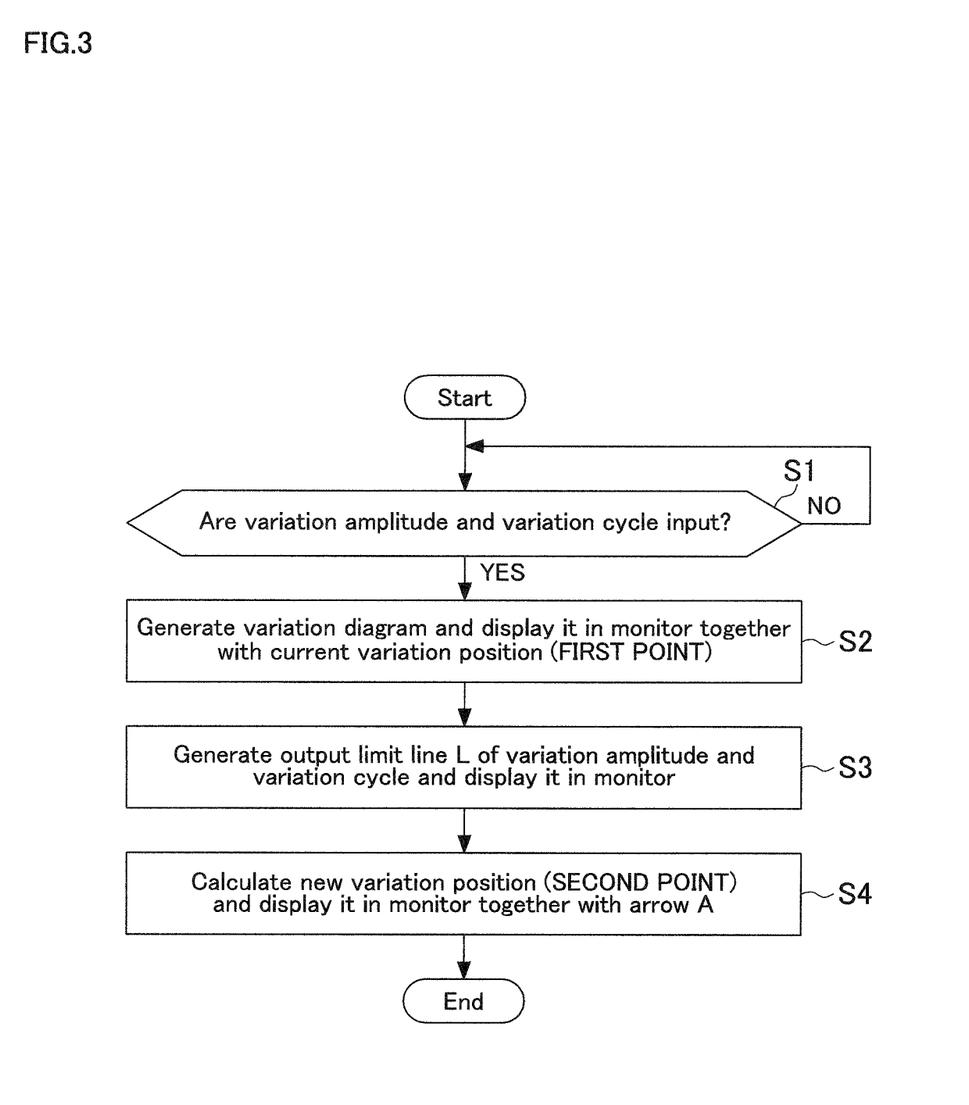
FIG. 3 is a flowchart for a monitoring method.

A monitoring method of the main spindle rotation speed by the monitoring device 13 will be described with the flowchart of FIG. 3.

Figure 4:
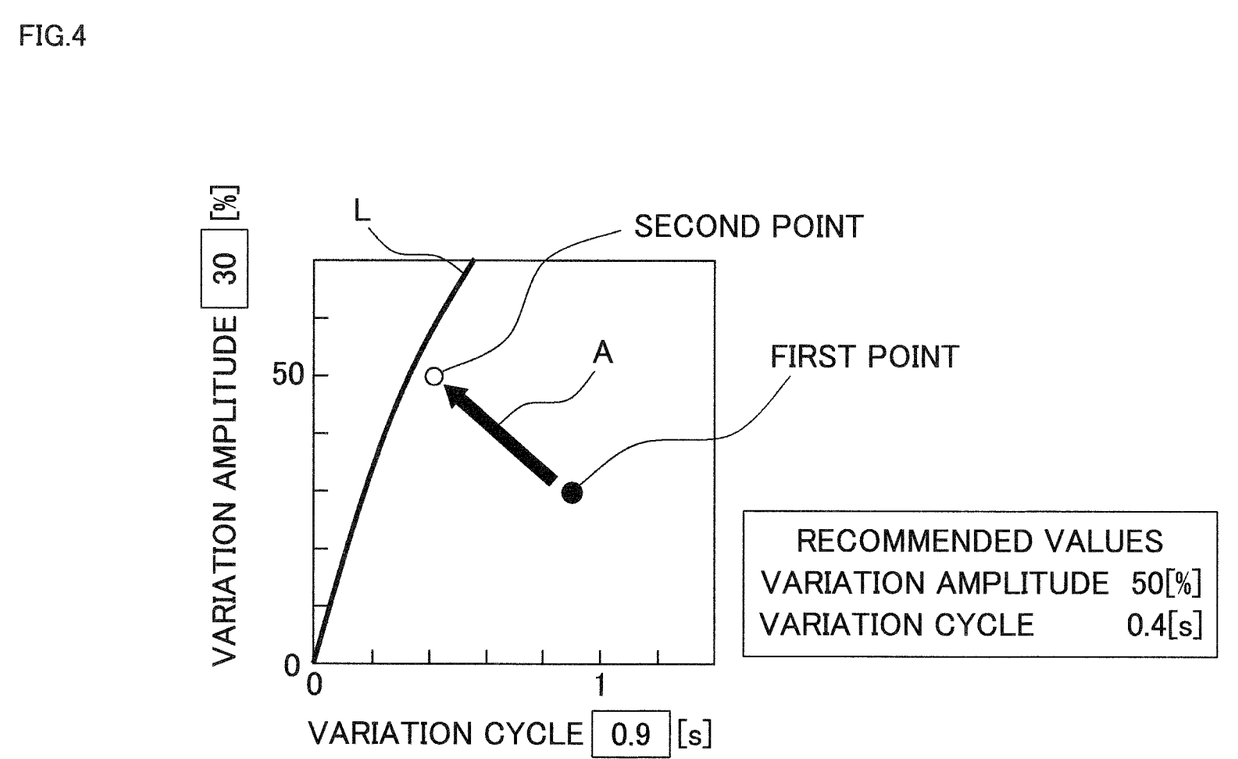
FIG. 4 is an explanatory view illustrating a variation diagram.

First, at S1, when the variation amplitude and the variation cycle are input to the variation value setting unit 11 (variation value setting step), a variation diagram illustrated in FIG. 4 is generated and displayed in the monitor 12 at S2 (drawing step). Here, a variation amplitude-variation cycle graph that plots the variation amplitude to vary the rotation speed on the vertical axis and the variation cycle on the horizontal axis is displayed.

The graph also displays a setting value of the current variation amplitude-variation cycle (current variation position) as a first point by a black-circle marker (first display step). An operator inputs the respective values of the variation amplitude and the variation cycle by directly pointing any given position on the graph or with a numeric keypad (not illustrated) or the like to change the respective setting values of the variation amplitude and the variation cycle.

Next, at S3, an output limit line L is displayed in the graph (settable range calculating step (output limit line displaying step)). Flowing an excessive current to the motor 6 generates heat and results in breakage of the motor 6, and therefore the upper limit of the input electric power is regulated. In other words, the motor output is limited. Therefore, even when the variation amplitude of the rotation speed is set to large and the variation cycle is set to small, the variation cannot be performed with the set value in some cases. Therefore, for example, in the following Math. 3, a usage proportion to a rated output of the motor 6 is calculated so as to have a value as the maximum output from the motor 6, thus displaying the output limit line L on the graph as a limit line of the settable variation amplitude and variation cycle. A maximum rotation speed $S_{max}$ of the main spindle and a minimum rotation speed $S_{min}$ of the main spindle used in Math. 3 can be calculated with a reference rotation speed as a reference for the varying rotation speed and the variation amplitude as shown in the following Math. 4 and Math. 5. It expresses that the rotation speed can be varied as the setting value in a range on the right side from the output limit line L (settable range). That is, the value in the range is preferably selected in the variation value setting unit 11. Math. 3 expresses that an output found by subtracting a loss ($P_c$) due to, for example, cutting and friction caused by the main spindle rotation from any given output from the motor 6 can be used for the variation of the main spindle rotation speed.

$$R = \frac{2J}{eP - P_C}(S_{max} - S_{min})S_{max} \qquad \text{[Math. 3]}$$

R: Variation cycle
J: Inertia of a rotating body including the workpiece and the main spindle
P: Rated output of the motor
$P_c$: Sum of cutting output and loss output
e: Usage proportion
$S_{max}$: Maximum rotation speed of the main spindle
$S_{min}$: Minimum rotation speed of the main spindle $$S_{max} = S_0\left(1 + \frac{Q}{200}\right) \qquad \text{[Math. 4]}$$

$S_0$: Reference rotation speed
Q: Variation amplitude $$S_{min} = S_0\left(1 - \frac{Q}{200}\right) \qquad \text{[Math. 5]}$$

It should be noted that, compared with the variation of the rotation speed at constant angular acceleration, the variation of the rotation speed at angular acceleration increased and decreased according to the increase and decrease in rotation speed allows obtaining a larger chattering reduction effect. In the case, instead of Math. 3 described above, the output limit line L of the variation amplitude and the variation cycle is calculated by the following Math. 6 using a ratio of the maximum rotation speed to the minimum rotation speed.

$$R = \frac{2J}{eP - P_C}(S_{max} - S_{min})S_{max}\frac{S_{max}}{S_{min}} \qquad \text{[Math. 6]}$$

Figure 5:
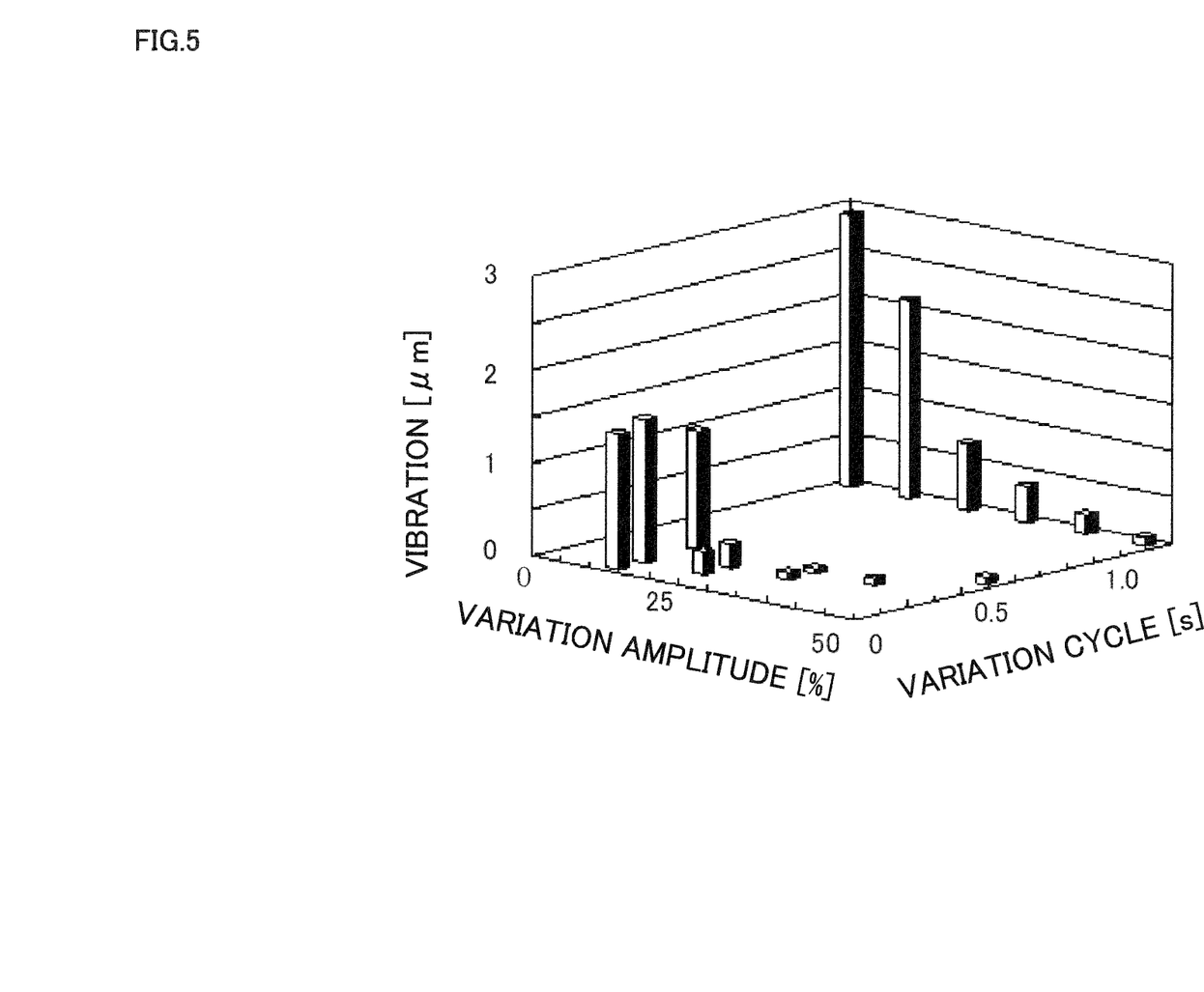
FIG. 5 is an explanatory view of experimental results by variation of the main spindle rotation speed.

Meanwhile, as described in Related Art, it is well known that the variation of the rotation speed of the main spindle 3 allows obtaining the reduction effect of chatter vibration. FIG. 5 illustrates experimental results when the rotation speed of the main spindle 3 is varied and the cutting work is performed. It is seen from the diagram that the short variation cycle and the large variation amplitude provide the large reduction effect of chatter vibration.

Therefore, at S4, as illustrated in FIG. 4, the variation value setting unit 11 calculates a new variation position where the variation cycle is shorter and the variation amplitude is larger than those of the first point in the range on the right side of the output limit line L of the variation amplitude and the variation cycle (variation position calculating step). The obtained new variation position is displayed as a second point by a white circle marker on the graph, and an arrow A heading from the first point to the second point is also displayed as a guide display (second display step). Additionally, here, values at the second point are displayed as recommended values on the right side of the graph.

Therefore, with reference to the arrow A and the second point displayed in the graph, the operator can easily set the new variation position where the possibility of reducing the chatter vibration is high.

The second point only needs to be calculated by, for example, as follows. A straight line extending from the position of the first point to the short cycle side and the large amplitude side with a preset inclination is calculated, and the second point is determined inside the output limit line L from the intersection point of the straight line with the output limit line L considering a preset degree of margin. Alternatively, a plurality of variation positions where the variation amplitude and the variation cycle are changed at preset ratios from the first point are calculated, and a variation position equal to or less than the output limit line L and closest to the output limit line L is selected from the obtained variation positions.

Thus, the monitoring device 13 of the main spindle rotation speed of the embodiment allows performing the monitoring method from S2 to S4 described above as the drawing unit, the first display unit, and the settable range calculating unit. The drawing unit displays the graph (variation diagram) illustrating the relationship between the variation amplitude and the variation cycle of the rotation speed in the monitor 12 (display unit). The first display unit displays the current variation position (first point) on the graph. The settable range calculating unit calculates the settable range of the variation amplitude and the variation cycle based on Math. 3.

Specifically, since the settable range of the variation amplitude and the variation cycle is calculated using the difference between the two rotation speeds at different timings and the usage proportion to the rated output of the motor 6, the output limit of the motor 6 is not exceeded and the variation can be performed with the set values, and the output from the motor 6 is not restricted more than necessary. Accordingly, even when the two setting values, the variation amplitude and the variation cycle, are present, the operator can easily select the setting value to vary the rotation speed based on the motor output limit inferred with further high accuracy. Therefore, the operator can quickly and easily find the machining condition optimal to reduce the chatter vibration.

Additionally, here, based on the settable range calculated by Math. 3, the output limit line L of the motor 6 is generated and displayed on the graph. Therefore, the operator can easily select the setting value to vary the rotation speed of the main spindle 3 based on the current variation position and the accurately inferred output limit line L on the graph.

Moreover, the new variation position (second point) where the variation amplitude is larger and the variation cycle is shorter than those of the current variation position is calculated in the range of equal to or less than the output limit line L, and the new variation position is displayed on the graph together with the arrow A that guides the change from the current variation position. Accordingly, the operator can quickly and easily find the machining condition optimal to reduce the chatter vibration with reference to the arrow A and the second point displayed on the graph.

While the configuration employs the maximum rotation speed as the first rotation speed and the minimum rotation speed as the second rotation speed, the configuration is not limited to the configuration. Respective values close to the maximum rotation speed and the minimum rotation speed may be obtained at any given timings to calculate the settable range of the variation amplitude and the variation cycle. The same applies to the case of using the ratio.

Figure 6:
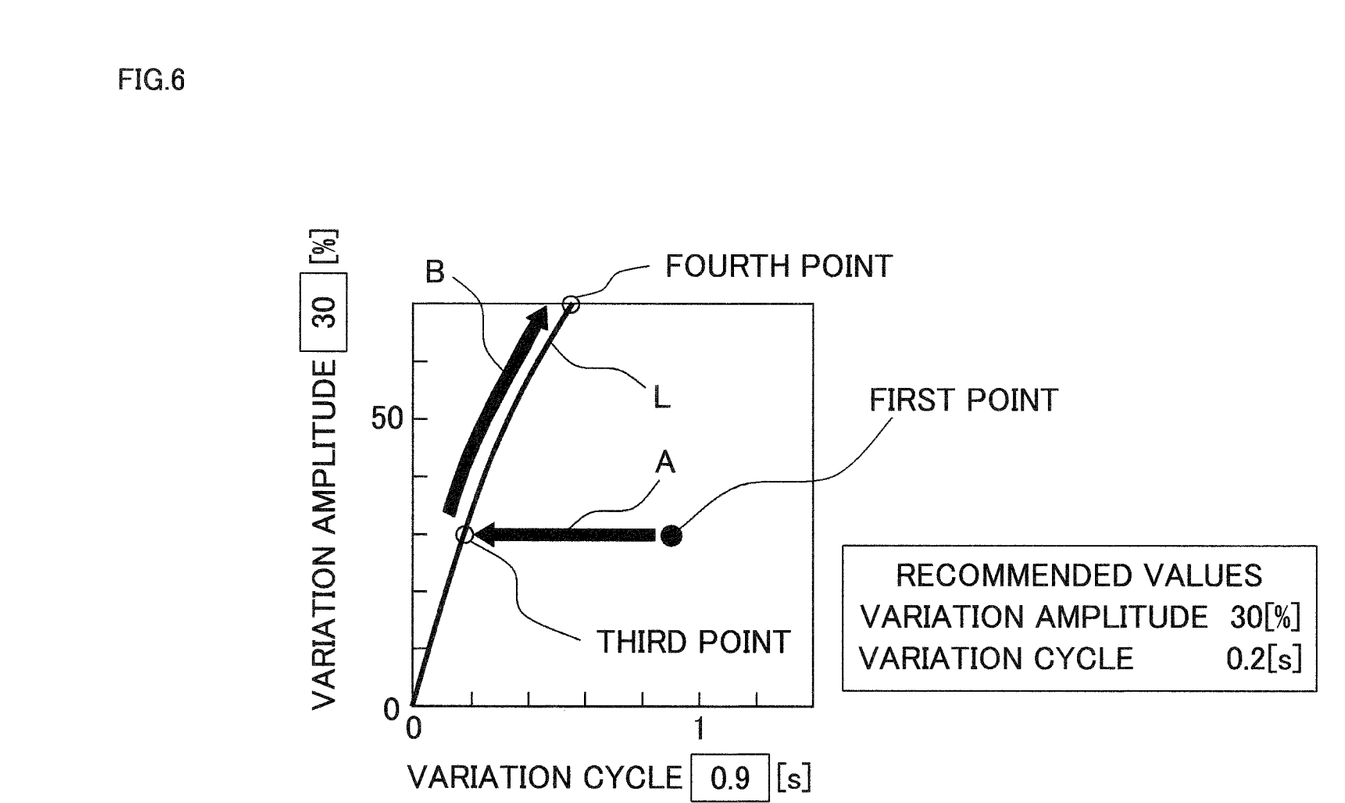
FIG. 6 is an explanatory view illustrating a modification example of the variation diagram.

While the second point where both of the variation amplitude and the variation cycle are changed is calculated and guided in the configuration, a guide that changes only the variation cycle so as to be short while the constant variation amplitude is maintained can also be performed. For example, as illustrated in FIG. 6, a point of the variation cycle on the output limit line L with the variation amplitude same as that of the first point is set to a third point, the arrow A that guides to the third point from the first point is displayed, and values of the third point are displayed as recommend values. The variation cycle of the third point can be obtained by transforming Math. 3 or Math. 6 and assigning the variation amplitude of the first point.

Thus, when the new variation position is set at the position on the output limit line L where the variation amplitude is same as that of the current variation position, since the variation cycle is short, the chattering reduction effect is large. Additionally, since the variation amplitude is the same, the difference between the maximum value and the minimum value of the cutting speed does not change, thereby ensuring minimizing deterioration of surface accuracy generated by the difference in cutting speed.

However, FIG. 6 also displays an arrow for the next guide in a case where the chatter vibration cannot be reduced at the third point. That is, an intersection point of the output limit line L with the maximum variation amplitude is set as a fourth point, and an arrow B that guides from the third point to the fourth point is displayed. A variation cycle of the fourth point is obtained by assigning a value of the maximum variation amplitude to Math. 3 or Math. 6. Comparing the fourth point with the third point, the difference in cutting speed increases and there is a possibility of deterioration of a machining surface. However, since the variation amplitude is large, the effect of reducing the chatter vibration is large. To obtain the reduction effect of chatter vibration immediately, the third point may be omitted and an arrow having the first point as the starting point and the fourth point as the ending point may be displayed.

Thus, when the new variation position is set to the position where the variation amplitude becomes the maximum on the output limit line L, the large reduction effect of chatter vibration is expected.

While the change in the variation position so as to change the output from the motor 6 is guided in the embodiment, the variation amplitude and the variation cycle can be simultaneously set while maintaining the output from the motor 6 at the current variation position constant. First, Math. 3 or Math. 6 is transformed to obtain the usage proportion of the motor 6 at the current position. Next, Math. 3 or Math. 6 is transformed and the usage proportion of the motor at the current position and any one of the variation amplitude and the variation cycle after change are assigned, the other value can be obtained, and two parameters of the variation amplitude and the variation cycle can be simultaneously set in one-time operation with the output from the motor 6 maintained constant. Accordingly, the operator can easily set the variation values to vary the rotation speed of the main spindle 3 in a state where a change in an amount of thermal displacement in association with the change in an amount of heat generation of the motor 6 is reduced.

Thus, when the variation position is changed while the output from the motor 6 is maintained constant, the variation value is easily changed to vary the rotation speed of the main spindle 3 in a state that the change in the amount of thermal displacement is reduced.

When the graph is displayed in the monitor, the output limit line, the new variation position, and the guide arrow are automatically calculated and displayed. However, they may be displayed at any given respective timings by the input unit disposed in the variation value setting unit. The configuration of the graph is obviously not limited to the contents, and changes, such as an inversion of the axes and three-dimensional display, are possible.

Additionally, the display of the variation position is not limited to be the circle, a marker having another shape may be selected or shapes of the markers may be changed between the current variation position and the new variation position. Furthermore, the guide display is not limited to the arrow. As long as a suggestion to the new variation position is possible, for example, while the marker of the current variation position is flashed, a display for movement to the new variation position being repeated, the configuration is appropriately changeable.

However, the new variation position and the guide display are not necessary to be disposed. Only the current variation position and the output limit line may be displayed in the monitor and the operator can select any new variation position at equal to or less than the output limit line such that the variation amplitude becomes large and/or the variation cycle becomes short from those of the current variation position. Thus, the operator also can easily select the setting value to vary the rotation speed based on the current variation position and the output limit line on the graph.

Furthermore, while the example in which both of the variation amplitude and the variation cycle are changed and the example in which only the variation cycle is changed have been described in the embodiments, only the variation amplitude may be changed.

The disclosure also includes a configuration that the monitor does not display the output limit line, the settable range of the variation amplitude and the variation cycle is calculated and stored, and when the operator inputs the variation amplitude and the variation cycle exceeding the settable range, a warning is performed by characters, a sound, or the like.

In the embodiment, the rotation speed is varied from the beginning and the machining is performed. In a machine tool including the well-known detection unit that compares a vibration obtained through detection of a vibration of a main spindle by a vibration sensor with a predetermined threshold and detects a chatter vibration, the main spindle may be rotated at a set uniform speed at first. Then, in the machine tool, when the detection unit detects the chatter vibration, the variation amplitude and the variation cycle of the rotation speed may be input in the variation value setting unit to vary the rotation speed, and the variation diagram, such as a graph, may be displayed in the monitor.

Additionally, the disclosure is not limited to the NC lathe, and as long as the machine tool that varies the rotation speed and performs the cutting work, for example, a machining center is included. Accordingly, the disclosure is also similarly applicable to a machine tool that includes only a tool spindle.

Also, in a case of the machine tool that includes the tool spindle to which a tool is mounted to be motor-driven and varies a rotation speed of the tool spindle together with a rotation speed of a workpiece spindle, the discloser is applicable. That is, in addition to the output limit line related to the workpiece spindle, the settable range (output limit line) of the variation amplitude and the variation cycle determined from the maximum output of a tool motor that drives the tool spindle with Math. 3 described above or the like is similarly constructed, and the settable range is displayed together. In the case as well, when the setting value is selected so as to be in the range on the right side of the two output limit lines, the rotation speed of the motor of the workpiece spindle and the rotation speed of the motor of the tool spindle are varied to be the setting values, respectively.

Besides, the storage unit, the variation value setting unit, and the monitor, which constitute the monitoring device, may be separated from the NC device and connected to the machine tool wirelessly or wired. In the case, one monitoring device performs centralized control on a plurality of machine tools, thus ensuring setting the variation amplitude and the variation cycle.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A monitoring device of a main spindle rotation speed in a machine tool that displays a variation state of the rotation speed by a rotation speed variation unit using a display unit in the machine tool, the machine tool including a main spindle and the rotation speed variation unit, the main spindle to which a tool or a workpiece is mounted being motor-driven, the rotation speed variation unit continuously varying the rotation speed of the main spindle in any given pattern, the monitoring device comprising:
    a variation value setting unit configured to set a variation amplitude and a variation cycle of the rotation speed;
    a drawing unit configured to display a variation diagram in the display unit, the variation diagram illustrating a relationship between the variation amplitude and the variation cycle;
    a first display unit configured to display a current variation position in the variation diagram; and
    a settable range calculating unit configured to calculate a settable range of the variation amplitude and the variation cycle based on a calculation formula, the calculation formula including the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, a rated output of a motor that drives the main spindle, and a usage proportion to the rated output of the motor, wherein
    the calculation formula is Math. 1 below, $$R = \frac{2J}{eP - P_C}(S_1 - S_2)S_1 \qquad [\text{Math. 1}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion.

2. The monitoring device of the main spindle rotation speed in the machine tool according to claim 1, wherein the calculation formula includes a ratio of the first rotation speed to the second rotation speed.

3. The monitoring device of the main spindle rotation speed in the machine tool according to claim 1, wherein any one of the first rotation speed and the second rotation speed is set as a maximum value of the rotation speed and another is set as a minimum value of the rotation speed.

4. The monitoring device of the main spindle rotation speed in the machine tool according to claim 1, further comprising
an output limit line display unit configured to generate an output limit line of the motor based on the settable range calculated by the settable range calculating unit and display the output limit line on the variation diagram.

5. The monitoring device of the main spindle rotation speed in the machine tool according to claim 1, wherein
the variation value setting unit is configured to simultaneously set the variation amplitude and the variation cycle based on the calculation formula.

6. A machine tool comprising:
a main spindle to which a tool or a workpiece is mounted is motor-driven;
a rotation speed variation unit configured to continuously vary the rotation speed of the main spindle in any given pattern; and
the monitoring device of the main spindle rotation speed according to claim 1.

7. The monitoring device of the main spindle rotation speed in the machine tool according to claim 4, further comprising:
a variation position calculating unit configured to calculate a new variation position where the variation amplitude is larger than the variation amplitude of the current variation position and the variation cycle is shorter than the variation cycle of the current variation position in a range equal to or less than the output limit line, or a new variation position where the variation amplitude is larger than the variation amplitude of the current variation position or the variation cycle is shorter than the variation cycle of the current variation position in a range equal to or less than the output limit line; and
a second display unit configured to display the new variation position in the variation diagram together with a guide display, the guide display guiding a change from the current variation position.

8. The monitoring device of the main spindle rotation speed in the machine tool according to claim 7, wherein
the new variation position is set to a position on the output limit line where the variation amplitude is same as the variation amplitude of the current variation position.

9. The monitoring device of the main spindle rotation speed in the machine tool according to claim 7, wherein
the new variation position is set to a position where the variation amplitude becomes a maximum on the output limit line.

10. The monitoring device of a main spindle rotation speed in a machine tool that displays a variation state of the rotation speed by a rotation speed variation unit using a display unit in the machine tool, the machine tool including a main spindle and the rotation speed variation unit, the main spindle to which a tool or a workpiece is mounted being motor-driven, the rotation speed variation unit continuously varying the rotation speed of the main spindle in any given pattern, the monitoring device comprising:
a variation value setting unit configured to set a variation amplitude and a variation cycle of the rotation speed;
a drawing unit configured to display a variation diagram in the display unit, the variation diagram illustrating a relationship between the variation amplitude and the variation cycle;
a first display unit configured to display a current variation position in the variation diagram; and
a settable range calculating unit configured to calculate a settable range of the variation amplitude and the variation cycle based on a calculation formula, the calculation formula including the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, a rated output of a motor that drives the main spindle, and a usage proportion to the rated output of the motor, wherein
the calculation formula is Math. 2 below, $$R = \frac{2J}{eP - P_C}(S_1 - S_2)S_1\frac{S_1}{S_2} \quad \text{[Math. 2]}$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion.

11. A monitoring method of a main spindle rotation speed in a machine tool that displays a variation state of the rotation speed by a rotation speed variation unit using a display unit in the machine tool, the machine tool including a main spindle and the rotation speed variation unit, the main spindle to which a tool or a workpiece is mounted being motor-driven, the rotation speed variation unit continuously varying the rotation speed of the main spindle in any given pattern, the monitoring method comprising:
setting a variation amplitude and a variation cycle of the rotation speed;
displaying a variation diagram in the display unit, the variation diagram illustrating a relationship between the variation amplitude and the variation cycle;
displaying a current variation position in the variation diagram; and
calculating a settable range of the variation amplitude and the variation cycle based on a calculation formula, the calculation formula including the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, a rated output of a motor that drives the main spindle, and a usage proportion to the rated output of the motor, wherein
the calculation formula is Math. 1 below, $$R = \frac{2J}{eP - P_C}(S_1 - S_2)S_1 \quad \text{[Math. 1]}$$

R: Variation cycle
$S_1$: Rotation speed at any given timing $t_1$ (first rotation speed)
$S_2$: Rotation speed at any given timing $t_2$ (second rotation speed)

J: Inertia of rotating body
P: Rated output of motor
$P_c$: Sum of cutting output and loss output
e: Usage proportion.

12. The monitoring method of the main spindle rotation speed in the machine tool according to claim 11, wherein the calculation formula includes a ratio of the first rotation speed to the second rotation speed.

13. The monitoring method of the main spindle rotation speed in the machine tool according to claim 11, wherein the calculation formula is Math. 2 below, $$R = \frac{2J}{eP - P_C}(S_1 - S_2)S_1 \frac{S_1}{S_2} \quad [\text{Math. 2}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Rated output of motor
$P_c$: Sum of cutting output and loss output
e: Usage proportion.

14. The monitoring method of the main spindle rotation speed in the machine tool according to claim 11, wherein any one of the first rotation speed and the second rotation speed is set as a maximum value of the rotation speed and another is set as a minimum value of the rotation speed.

15. The monitoring method of the main spindle rotation speed in the machine tool according to claim 11, further comprising generating an output limit line of the motor based on the settable range calculated by the calculating of the settable range and displaying the output limit line on the variation diagram.

16. The monitoring method of the main spindle rotation speed in the machine tool according to claim 11, wherein the setting is capable of simultaneously setting the variation amplitude and the variation cycle based on the calculation formula.

17. The monitoring method of the main spindle rotation speed in the machine tool according to claim 15, further comprising:
calculating a new variation position where the variation amplitude is larger than the variation amplitude of the current variation position and the variation cycle is shorter than the variation cycle of the current variation position in a range equal to or less than the output limit line, or a new variation position where the variation amplitude is larger than the variation amplitude of the current variation position or the variation cycle is shorter than the variation cycle of the current variation position in a range equal to or less than the output limit line; and
displaying the new variation position in the variation diagram together with a guide display, the guide display guiding a change from the current variation position.

18. The monitoring method of the main spindle rotation speed in the machine tool according to claim 17, wherein the new variation position is set to a position on the output limit line where the variation amplitude is same as the variation amplitude of the current variation position.

19. The monitoring method of the main spindle rotation speed in the machine tool according to claim 17, wherein the new variation position is set to a position where the variation amplitude becomes a maximum on the output limit line.

* * * * *